Figure 1:
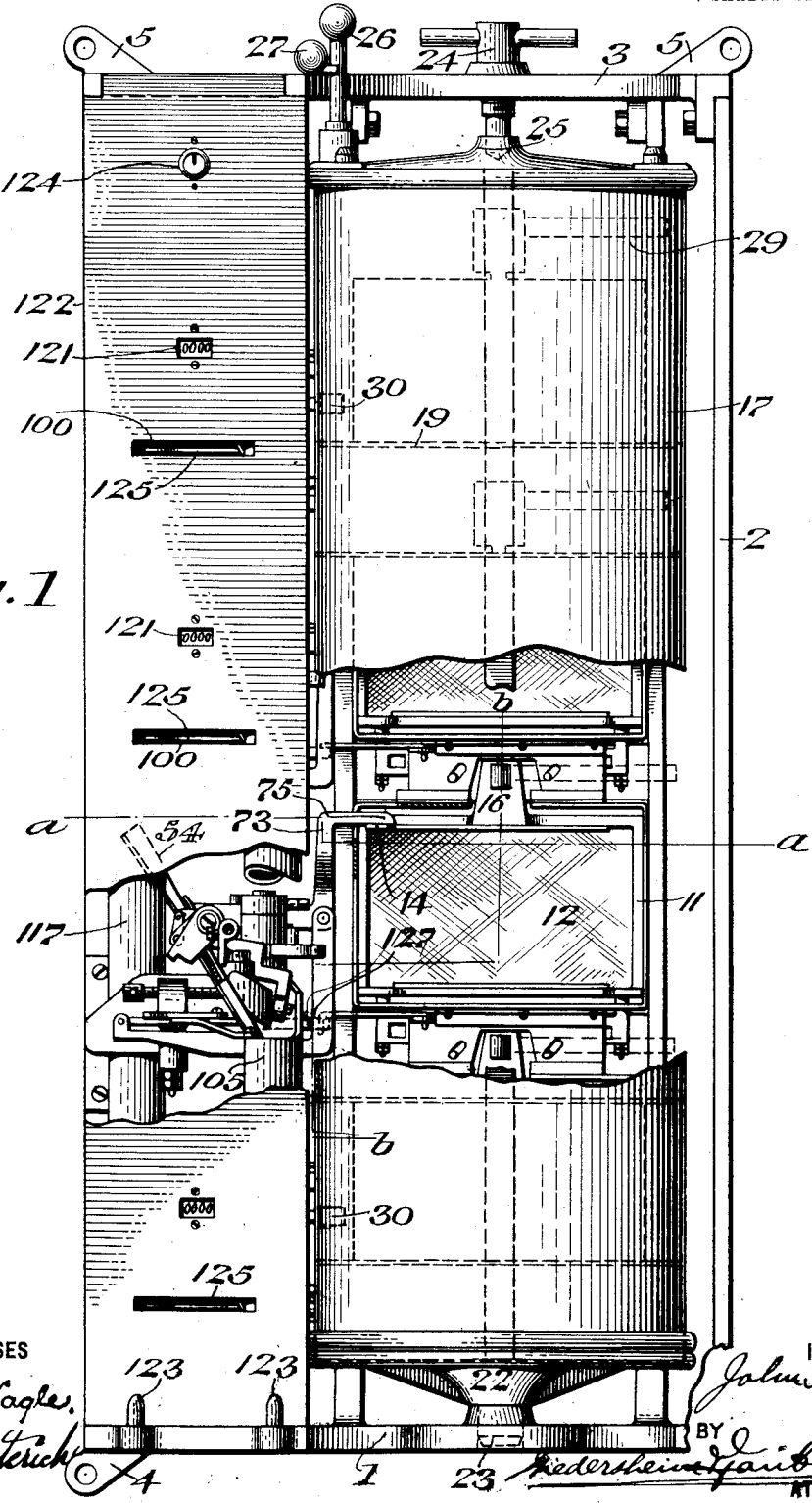

J. FRITSCHE.
CHECK OR COIN CONTROLLED VENDING APPARATUS.
APPLICATION FILED DEC. 20, 1911.

1,039,508.

Patented Sept. 24, 1912.

7 SHEETS—SHEET 1.

WITNESSES
INVENTOR
John Fritsche.
BY
ATTORNEYS

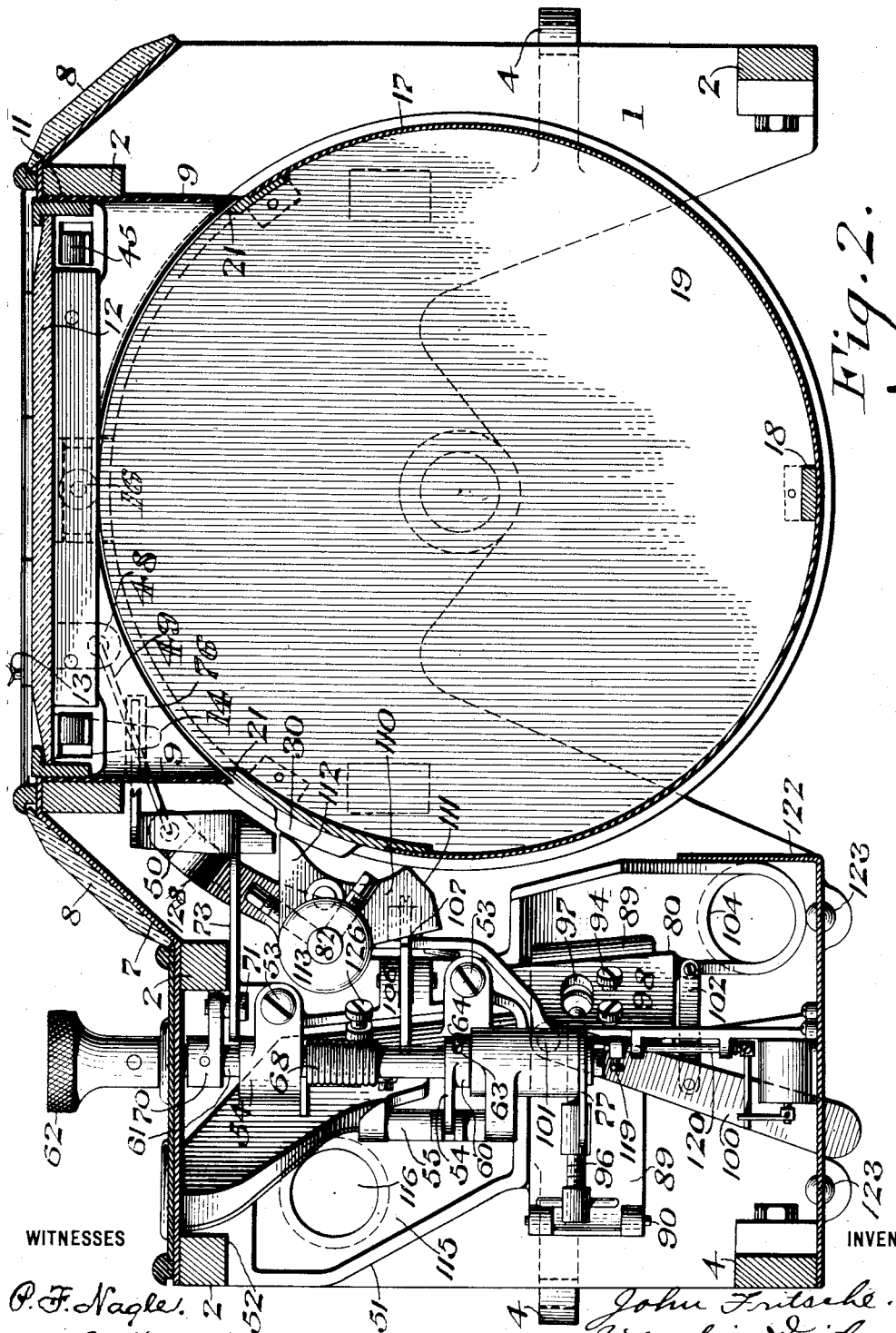

J. FRITSCHE.
CHECK OR COIN CONTROLLED VENDING APPARATUS.
APPLICATION FILED DEC. 20, 1911.
1,039,508.
Patented Sept. 24, 1912.
7 SHEETS—SHEET 3.
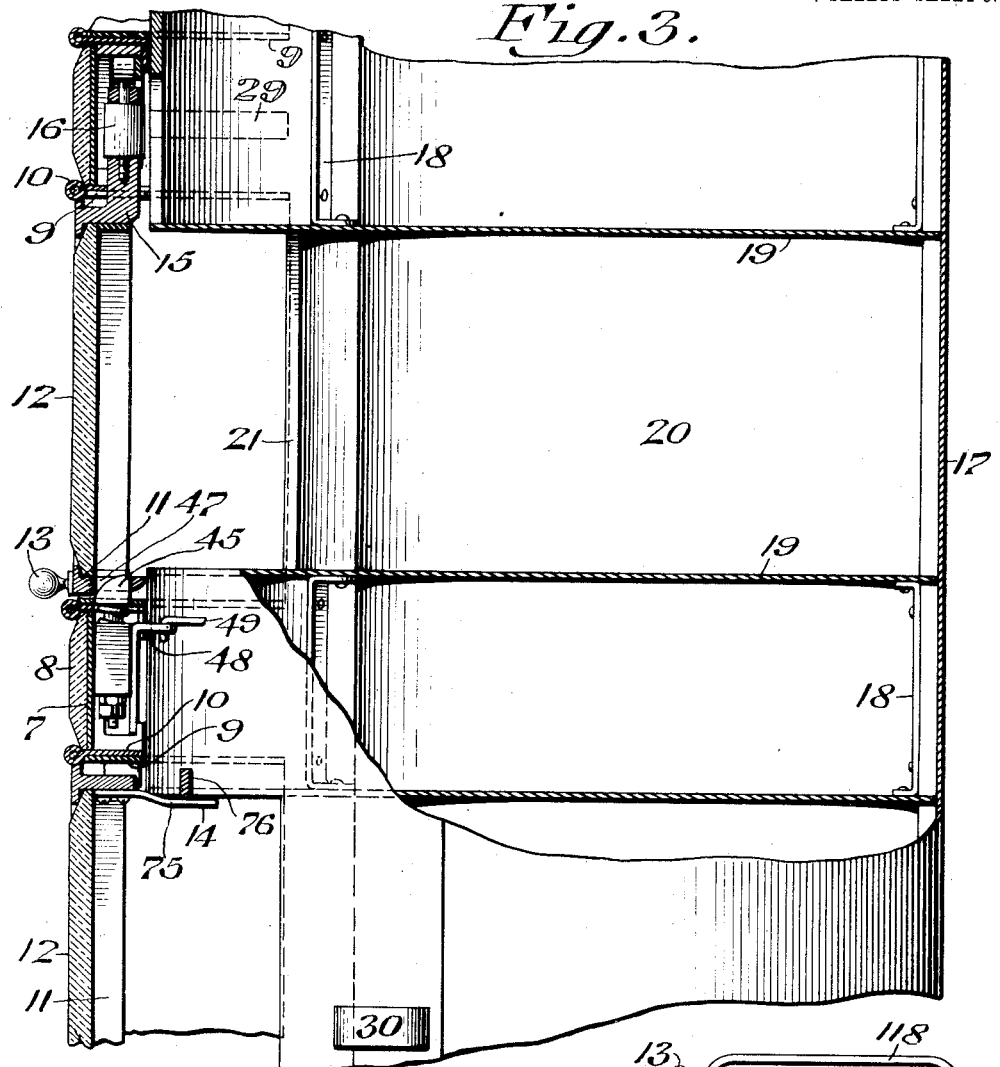
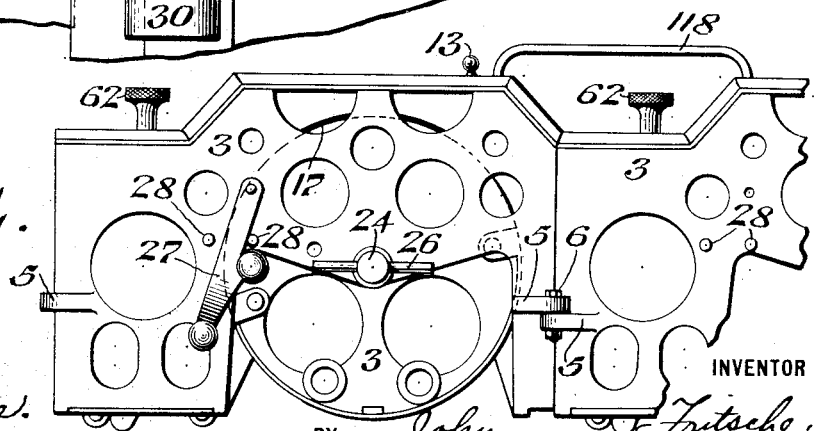
WITNESSES
P. F. Nagle
H. G. Dieterich
INVENTOR
John Fritsche
BY Niedersheim Fairbanks
ATTORNEYS

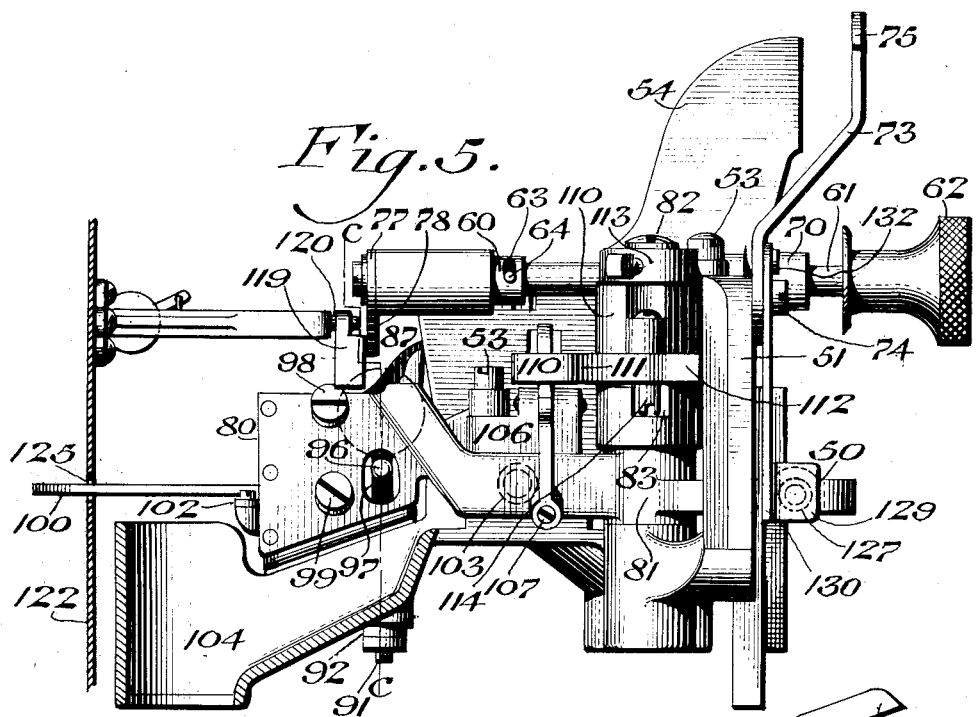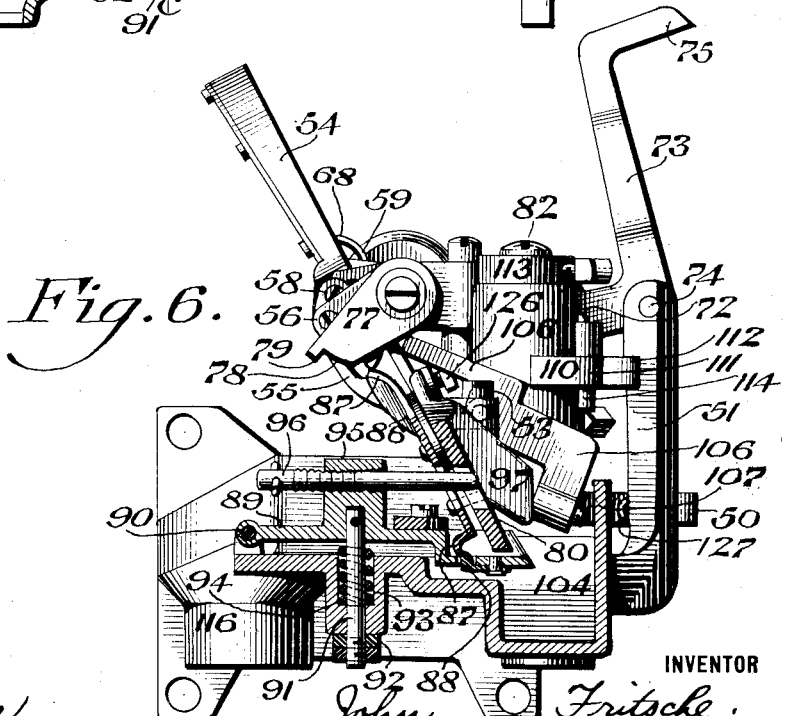

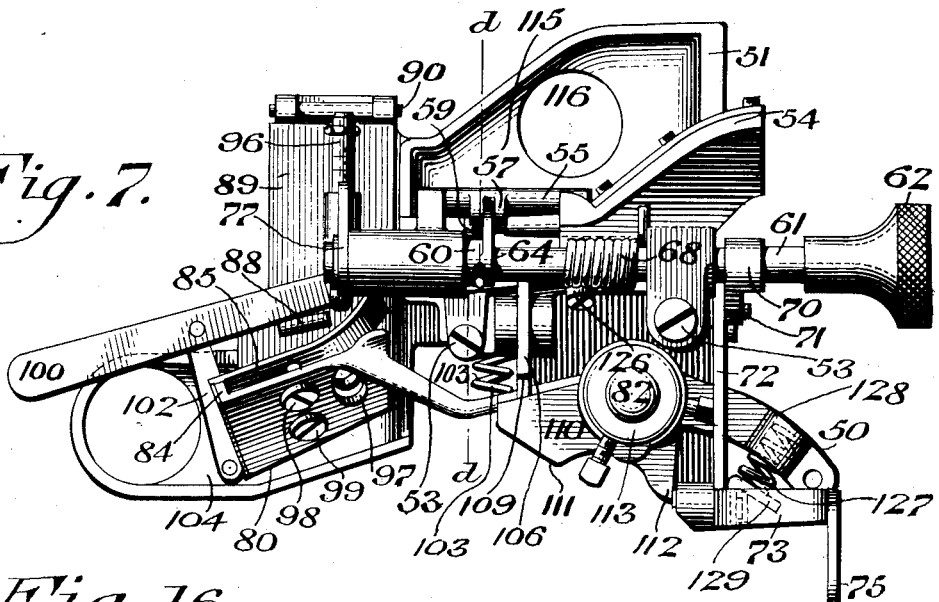

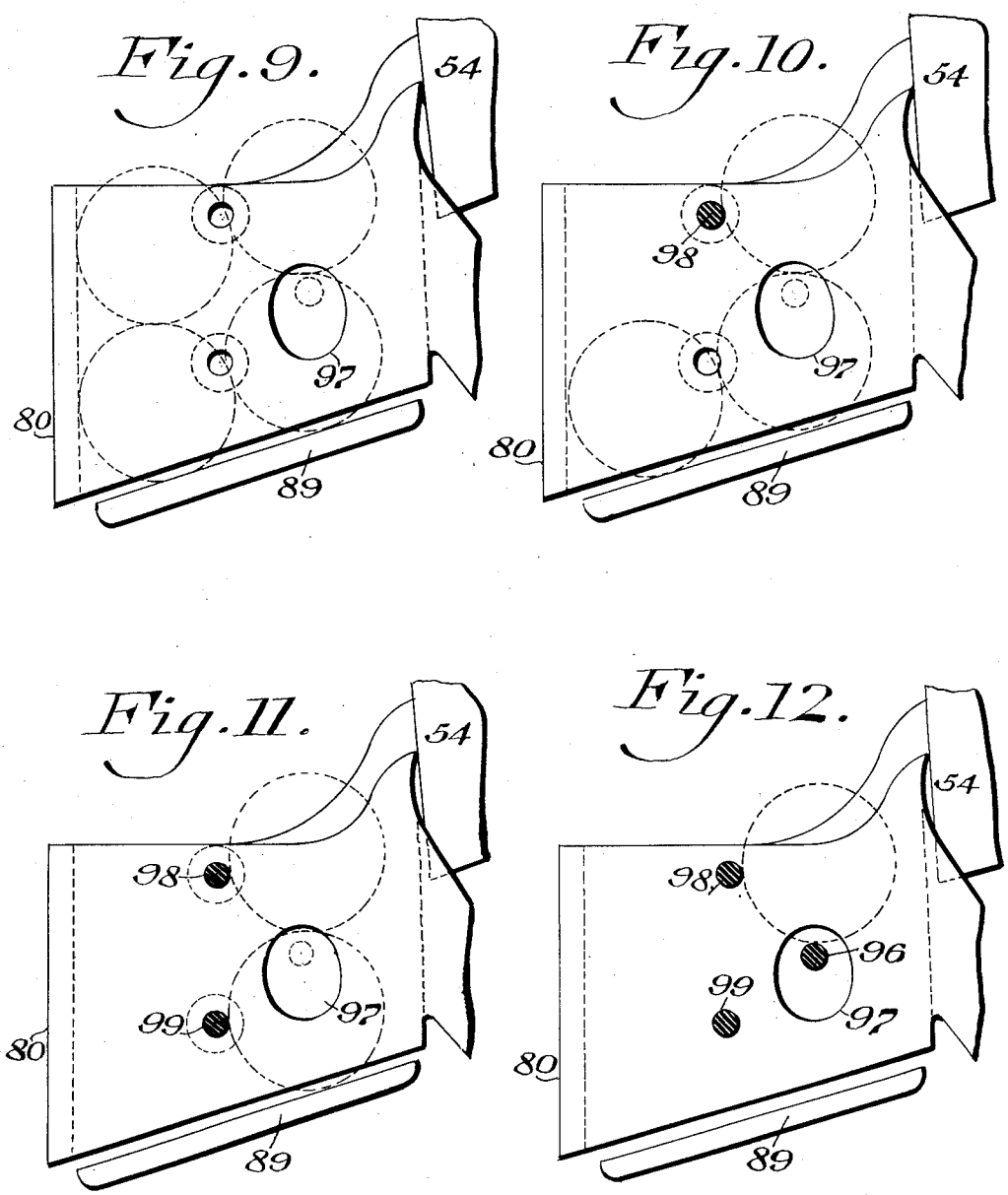

J. FRITSCHE.
CHECK OR COIN CONTROLLED VENDING APPARATUS.
APPLICATION FILED DEC. 20, 1911.
1,039,508.
Patented Sept. 24, 1912.
7 SHEETS—SHEET 7.
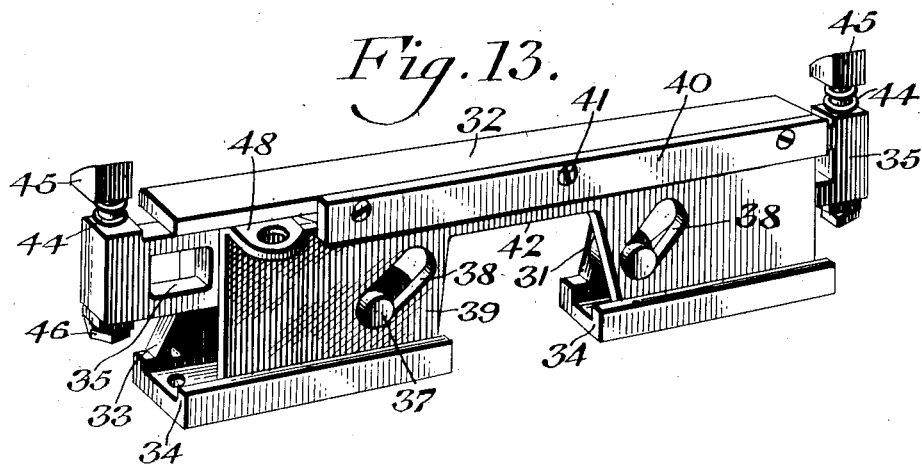
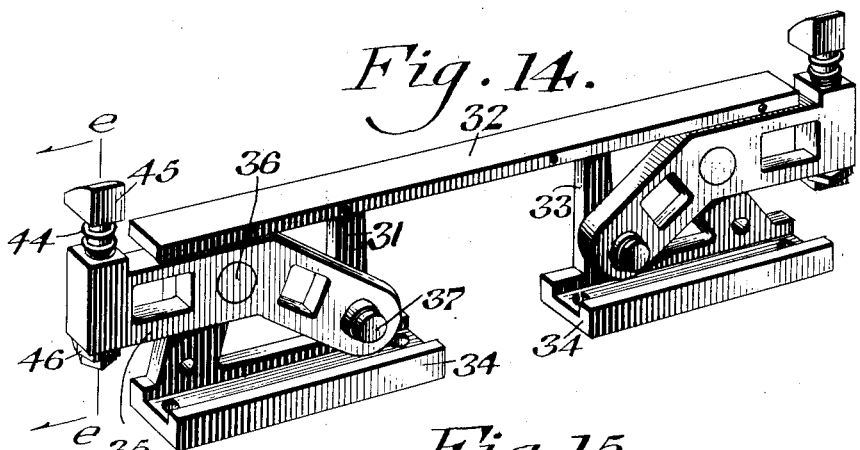
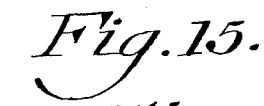
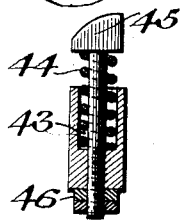
WITNESSES
INVENTOR
John Fritsche,
BY
ATTORNEYS

UNITED STATES PATENT OFFICE.

JOHN FRITSCHE, OF PHILADELPHIA, PENNSYLVANIA, ASSIGNOR OF ONE-THIRD TO JOSEPH V. HORN AND ONE-THIRD TO FRANK HARDART, BOTH OF PHILADELPHIA, PENNSYLVANIA.

CHECK OR COIN CONTROLLED VENDING APPARATUS.

1,039,508.  Specification of Letters Patent.  Patented Sept. 24, 1912.

Application filed December 20, 1911. Serial No. 666,920.

*To all whom it may concern:*

Be it known that I, JOHN FRITSCHE, a citizen of the United States, residing in the city and county of Philadelphia, State of Pennsylvania, have invented a new and useful Check or Coin Controlled Vending Apparatus, of which the following is a specification.

My present invention relates to a novel check or coin controlled vending apparatus which is constructed of units in such a manner that any desired number of units may be united together to form a vending structure of any desired dimension.

It further consists of a novel construction of a vending machine which may be readily retained in a sanitary condition at all times.

It further consists of a novel construction of a coin controlled mechanism which embodies a novel construction of a coin retainer, novel means for actuating the same, and novel means for preventing the passage of coins into the machine to work the machine when the same is inoperative.

It further consists of a novel door locking mechanism.

It further consists of a novel construction of an article container, and novel means whereby the rotation of the container will close the door and operate the door locking mechanism.

It further consists of a novel construction of a vending machine in which novel means are provided for registering the number of coins which pass through the coin slot to actuate the machine and novel means for indicating to the attendant that the machine has been operated by a purchaser.

It further consists of a novel construction of a coin retainer which may be readily adjusted to receive one or more coins and thereby provide a vending apparatus which may be readily and quickly adjusted to operate upon the insertion of one or more coins.

It further consists of a novel construction of a coin mechanism wherein is employed a novel construction of a coin retainer and a novel construction of a spring actuated detent therefor which, in the present instance, also serves to carry one of the adjustable stops for adapting the coin retainer to receive one or more coins.

It further consists of novel means for initially opening the door which controls access to the article receiving compartment of the container.

It further consists of a novel construction of a vending machine adapted to receive a rotatable article container which is mounted therein in a novel manner and novel means for locking the container in operative position.

It further consists of a novel construction of a coin chute and novel means for preventing injury to the working parts, by the actuation of the handle 62, when the vending machine is in inoperative condition.

It further consists of other novel features of construction, all as will be hereinafter fully set forth.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a rear elevation of a coin controlled vending machine embodying my invention, certain parts thereof having been removed for the sake of clearness of illustration. Fig. 2 represents a sectional plan view of my device on line *a—a* Fig. 1. Fig. 3 represents a sectional elevation of a portion of Fig. 1, the section being taken on line *b—b* of said figure. Fig. 4 represents a plan view of a plurality of vending machine units showing more clearly the manner in which they are united together. Fig. 5 represents a side elevation of the coin mechanism partly in section and showing in addition the coin registering mechanism. Fig. 6 represents a sectional elevation of the coin mechanism on line *c—c*, Fig. 5. Fig. 7 represents a plan view of the coin mechanism showing the position the parts assume at one stage of the operation. Fig. 8 represents a section on line *d—d*, Fig. 7. Figs. 9, 10, 11 and 12 represent side elevations of the movable coin retainer and indicate the manner in which the same is adjusted to provide for the operation of the machine by one or more coins. Fig. 13 represents a perspective view of the door locking mechanism, in detached position. Fig. 14 represents a perspective view similar to Fig. 13 but having certain parts removed to indicate more clearly details of the construction. Fig. 15 represents a section on line e—e Fig. 14. Fig. 16 represents a perspective view of a portion of Fig. 7.

Similar numerals of reference indicate corresponding parts in the figures.

Referring to the drawings, my present invention is constructed in such a manner that a series of vending units are provided which may be united to form a vending structure of any desired dimensions and while especially designed for the vending of articles of food, it will be apparent it is not limited to such use but may be employed to vend any desired article.

*The frame of the machine.*—The outer contour of the framework may vary in accordance with the conditions met with in practice and in the embodiment illustrated includes a bottom plate or casting 1 which supports the standards 2, to which latter the top plate or casting 3 is secured in any desired manner. The bottom plate 1 is provided with apertured lugs 4 while the top plate 3 is provided with apertured lugs 5 whereby different units of structure may be secured together by fastening devices 6, as will be apparent by reference to Fig. 4. 7 designates the front plate to which are secured in any desired manner the mirrors 8. The front plate 7 has secured thereto door casings 9 to which are fastened plates 10 which are deflected at their forward ends to form beads which serve to retain the mirrors 8 in place and also to carry the doors 11 which are hinged to such beads. The doors 11 are provided with a preferably transparent front 12 and also with an actuating handle 13. The door 11 has secured thereto a rearwardly extending spring 14 the purpose of which will hereafter appear in the description of the operation. 15 designates an extension of the door frame in which is mounted a roller 16, the purpose of which will appear in the description of the article or food container which will now be described.

*The article or food container.*—The construction of the article or food container will vary in accordance with the character of the articles which it is desired to vend, and for the purpose of illustrating one type of a container, I have shown one which is adapted to vend articles which are not materially affected by atmospheric conditions, such as, for example, sandwiches, cakes, or any other desired article.

17 designates a container, comprising in the present instance, a cylindrical shell having secured thereto by means of brackets 18, as will be best understood by reference to Fig. 2, shelves 19 which form article or food receiving compartments 20, a portion of the shell being cut away as indicated at 21 in Fig. 2, in order to form a closed compartment having an open side. The lower end of the container 17 is provided with a boss 22 from which extends a shaft 23, which is journaled in the base 1 in any desired manner.

24 designates a rod having threaded engagement with the top plate 3 and seated in an apertured boss 25 at the upper end of the container 17, said rod 24 being provided with a grasping portion whereby the latter may be readily rotated in order to permit the container 17 to be removed for the purpose of cleansing or repairs.

26 designates a rod extending upwardly from the container 17 and adapted to interlock with a lever 27 pivotally carried by the top plate 3, the movement of said lever being limited by stop pins 28 located on opposite sides of the lever 27.

29 designates a cam on the periphery of the container 17 adapted to coact with the roller 16 in order to close the door 11 as will be apparent by reference to Fig. 3. The outer periphery of the container 17 is also provided with a cam 30 adapted to control the passage of coins through the coin mechanism and also to control the locking and unlocking of the door of the vending machine and the construction of such door locking mechanism will now be explained.

*The door locking mechanism.*—31 designates a bracket which is provided with a top plate 32 to which are secured the downward extensions 33, which latter carry the slotted plates 34, which are spaced apart in order that the extension 15 of a door may pass therebetween as will be understood by reference to Fig. 1.

35 designates levers pivoted to the plates 33, at 36, and having one end extending downwardly and provided with the pins 37, which latter are adapted to be seated in the cam slots 38 of the cam plate 39 when the parts are in assembled position. The cam plate 39 is mounted in the slotted plates 34 and engages one side wall thereof and is maintained in assembled position by means of a plate 40 secured by fastening devices 41 to the top plate 32, it being noted that the cam plate 39 is cut away, as indicated at 42, in order to permit the extension 15 of the door 11 to pass therethrough when the door is being opened. The outer ends of the levers 35 are apertured as indicated at 43, in order to receive a spring 44, one end of which abuts against a plunger 45, the upper face of which is preferably beveled, while the stem of the plunger 45 passes through the lever 34 and is provided with a plurality of nuts 46, one of which serves as a lock nut. The frame of the door 11 is provided with the apertures 47 in order that the locking plungers 45 may pass therethrough, as will be best understood by reference to Fig. 3. The cam plate 39 is provided with an apertured lug 48, best seen in Figs. 2 and 13, and to which is secured a rod 49, which latter is also connected with an arm 50, which is actuated by the coin mechanism which will now be described.

*The coin mechanism.*—The coin mechanism is best seen in Figs. 1, 2 and 5 to 12 inclusive. The coin mechanism is mounted in a frame consisting of a casting 51 which is adapted to be secured to the standards 2 in any desired manner, the casting preferably being faced off as indicated at 52 in Fig. 2, in order to provide a simple and compact construction. The casting 51 has secured thereto by means of fastening devices 53 a coin chute 54, the outer end of which extends through the casing. The coin chute 54 is provided with a pivoted side 55 which is provided at 56 with the upwardly extending ears 57, through which passes a pin 58 which latter coöperates with the forked extension 59 of a collar 60 loosely mounted on the operating shaft 61 which latter is journaled in the coin chute casing 54. The shaft 61 is provided with an actuating handle 62, which extends exteriorly of the vending machine casing, as will be best understood by reference to Fig. 2. The collar 60 is provided with a slot or aperture 63, through which passes a pin 64, which is in engagement with the operating shaft 61, it being understood that the pivoted side 55 of the coin slot is mounted in such a manner that it will move outwardly owing to its own weight and the manner in which it is pivoted. The stationary side of the coin chute is provided with a laterally and downwardly extending flange 65 while the side of the stationary chute opposite to the flange 65 forms a substantially plain surface 66, the lower end of which is beveled, as indicated at 67, in order to form with the lower end of the curved inner face of the pivoted member 55 a V-shaped slot.

68 designates a spring mounted on the operating shaft 61 and having one end bearing against the stationary portion of the device, such as for example, the coin chute 54, while the other end thereof is secured to said shaft by means of a fastening device 69, as will be best understood by reference to Figs. 2 and 7, whereby the coin shaft is maintained in its normal position and the movable member of the coin shaft is maintained in closed position as is seen in Fig. 8. The actuating lever 61 also has secured thereto an arm 70 in which is mounted a pin 71 which coöperates with the forked end 72 of a lever 73 which is pivoted at 74 to the casting 51, said lever 73 having an angular extension 75 adapted to pass through a slot 76 in the door casing 9 as will best be understood by reference to Fig. 2, said angular extension 75 bearing on the spring 14 to cause the initial opening of the door 11, as will be best understood by reference to Figs. 2 and 3.

77 designates an arm secured in any desired manner to the operating shaft 61 and provided with a cam face 78 and a shoulder 79 which latter is adapted to engage a coin which has been retained in the coin receiver 80, which latter will now be described. The coin receiver 80 is provided with a hub 81 which is a stationary shaft 82 and said hub is provided with a recess or slot 83, it being understood that the arm 50 which controls the door locking mechanism is also connected with the hub 81, as will be best understood by reference to Figs. 2, 5 and 7. The coin retainer 80 consists of a plate or casting having the laterally extending flange 84 seen in Fig. 7 and to which is secured a plate 85, the free end of which is laterally deflected, as indicated at 86, in order that the same will form a guide for the coin or coins passing through the coin chute 54. The plate 85 has secured thereto at its lower end, as indicated in Fig. 6, a catch 88 carried by a plate 89 pivoted at 90 to the casing 51, it being noticed that the end of the plate 89 which carries the catch 88 is downwardly deflected or offset as is best seen in Fig. 6.

91 designates a rod secured to the plate 89 and passing through the casting 51 and provided with a plurality of nuts 92 one of which forms a lock nut said casting being recessed as indicated at 93 in order to receive a spring 94, the upper end of which abuts against the plate 89 in order to normally maintain the same in raised position. 95 designates a lug carried by the plate 89 in which is longitudinally adjustable a rod 96, which latter in the present instance is in threaded engagement therewith, and is adapted to pass through an aperture 97 in the coin retainer.

98 and 99 designate stop devices which, in the present instance, consist of screws having threaded engagement with the coin retainer 80.

100 designates an indicating arm one end of which is pivoted at 101, as seen in Fig. 2, and to said indicating arm 100 is pivoted a link 102 which is also pivoted to the coin retainer 80.

103 designates a spring located intermediately of the casting 51 and the coin retainer 80, the tension of which tends to move the parts into the position seen in Fig. 7, the movement of the coin retainer to the right being prevented by its engagement with a wall of the coin chute 104, which is adapted to be connected by conduits 105, as seen in Fig. 1, so that all of the coins which pass into the machine to operate the same may be received in a suitable coin receptacle (not shown).

106 designates an angular shaped arm, which will be best understood by reference to Figs. 5 to 8 inclusive, said arm being pivotally supported at 107 to the casting 51 and having one end provided with a set screw 107, which is adapted to bear against a portion of the coin retainer 80, while the opposite end 108 of the arm 106 is adapted to extend into the coin chute, as will be best seen by reference to Fig. 8, it being understood that the stationary portion of the coin chute is suitably apertured in order to permit such movement. The arm 106 is provided with a shoulder 109 with which is adapted to engage the cam member 110 provided with a cam face 111, which is adapted to coöperate with the cam 30, as best seen in Figs. 1 and 3, the cam member 110 being rotatably mounted on the shaft 82 and provided with a stop member 112 which is adapted to abut against a portion of the casting 51.

113 designates a set collar whereby the cam member 110 and the hub 81 of the coin retainer 80 are secured in assembled position. The cam member 110 is provided with a set screw 114 which is adapted to travel in the recess 83 of the hub 80, in order that the article or food container will cause the coin retainer to be returned to its operative position at a desired time, as will be explained in the description of the operation. The casting 51 is also provided with the chambered portion 115, which extends beneath the coin chute and has a discharge opening 116, which is adapted to be connected by means of suitable conduits 117, which lead to a receptacle 118 located exterior of the vending machine casing, in order that improper or bogus coins will be returned to a position accessible to the intending purchaser. In order that the coins may be registered which pass through the coin mechanism to actuate each machine, I provide for each unit of coin mechanism a registering device consisting of an arm 119 mounted on a shaft 120, so that when a coin passes to the coin chute into the coin retainer, it will strike the arm 119 and cause the shaft 120 to rock, whereby each coin will be registered as it passes into the coin retainer and the number of coins indicated on the dial 121, which may be seen through openings in the plate 122, which latter is adapted at its lower ends to bear against the pins 123, carried by the bottom plate 1, and is provided with a lock 124 whereby the operative parts of the vending structure may be incased in order to render the same fool-proof. The plate 122 is also provided with slots 125, through which the indicating arms 100 are adapted to pass, the position of said arms indicating whether or not the article receiving compartment is full or empty.

126 designates a set screw carried by the stationary portion of the coin chute and abutting against the movable side 55 to vary the size of the coin slot, as will be understood by reference to my prior Patent No. 852,111, granted April 30th, 1907, for fraud preventive device for coin mechanisms.

The operation of my novel vending machine will now be readily apparent to those skilled in this art and is as follows:—Assuming that the container 17 is in the position seen in Fig. 1 and that the article or food receiving compartments have the desired article therein which it is desired to vend, it will be understood that the rod 26 is interlocked with the pivoted rod 27 and that the container is in the position seen in Figs. 1 and 2 and that cam 110 is in the position seen in Fig. 2, in order to maintain the door 11 in closed position at which time the spring pressed plungers 45 extend into the apertures 47 in the frame of the door 11, as will be understood by reference to Figs. 2 and 3, and that the angular extension 75 is in proximity to the spring 14. The front of the vending machine is provided with indicating data showing the character of the article which is in each of the compartments, it being understood that the container and vending machine may be of any desired dimensions and that any desired number of article receiving compartments may be employed. The coin retainer 80 is adapted to be operated with either one, two or three coins of a desired dimension, such as for example, five cent pieces. In order to adjust the coin retainer to operate with a single five cent piece, the stops 98 and 99 are screwed in and also the stop 96, as seen in Fig. 12, while if it is desired to operate the machine with two coins, the stops 98 and 99 are screwed in while the stop 96 is screwed out until it is out of the path of a coin passing into the coin retainer 80. If the machine is to be operated with three coins, the stop 98 is screwed in while the stops 99 and 96 are screwed out so that they are out of the path of the coin in the coin retainer 80. In case it is desired to operate the machine with four coins, all of the stops 98, 99 and 96 are screwed out so that the slot in the coin retainer will receive four coins, as will be understood by reference to Fig. 9.

Assuming now that the coin retainer has been adjusted so that the machine is adapted to be operated with a single coin, the stops 98 and 96 being in the position seen in Figs. 5, 6 and 12, the intending purchaser places a coin or check of the proper dimension in the slot in the front face of the vending machine which registers with the coin chute 54 and if the coin is of the proper dimension it passes through said chute between the movable member 55 and the stationary wall 66, engages with the flange 65 and passes directly into the coin retainer 80 and into engagement with the stops 98 and 96, assuming the position seen in Figs. 5 and 12. The intending purchaser then partially rotates the handle 62 to the right whereupon a number of different actions take place, one of which is that the shaft 61 is partially rotated thereby causing the cam face 78 to engage the coin and press downwardly thereon until the shoulder 69 comes into engagement with the side of the coin. As the coin passes downwardly on the stops 98 and 96 it causes the plate 89 which is resiliently mounted to be moved downwardly against the tension of the spring 94, whereupon the catch 88 is released from its engagement with the catch 87 whereupon the tension of the spring 103 will cause the coin retainer to move to the right from the position seen in Fig. 2 to that seen in Fig. 7. The coin retainer 80 engages the side wall of the coin chute 104 as the coin retainer 80 passes beyond the end of the plate 89 in proximity to the coin chute 104 and the coin will be discharged from the coin retainer 80 into the coin chute 104 from whence it passes through the conduit 105 to a suitable coin receptacle, it being remembered that the coin is registered in a manner which will now be described.

As the coin passes into the coin retainer it engages the arm 119, thereby causing the shaft 120 to rock and the indicating dial 121 to show the next higher number thereon to that already indicated, in the usual manner, so that the number of coins which pass through a vending mechanism to operate the vending machine will be visibly indicated at the rear of the machine so that the same can be readily read by the attendant in charge of the machines. As the coin retainer 80 moves from the position seen in Figs. 2 and 5 to that seen in Fig. 7, the hub 81 will be rocked on its bearing pin 82, the result of which will be to cause the arm 50 to exert a pull on the rod 49 which will cause the cam plate 39 to which said rod is secured to move to the left from the position indicated in Fig. 13, and owing to the provision of the pins 37 and the cam slots 38, the levers 35 will be rocked on their fulcrums 36 in such a manner as to move the spring pressed plungers 45 out of engagement with the apertures 47 in the frame of the door 11 in order to release said door. Simultaneously with the above operation which occurs when the shaft 61 is rotated, said shaft owing to the provision of the arm 70 mounted on said shaft and which actuates the pin 71 coöperating with the forked arm 72 of the lever 73, the end 75 of said arm 73 will be rocked on its fulcrum 74, thereby causing the end 75 to press downwardly on the spring 14 and cause the door 11 to swing outwardly on its pivot, and thus indicate to the intending purchaser that the door has been opened and is ready to be raised in order that the hand of the purchaser may be inserted into a compartment 20 in order to remove therefrom the article which has been paid for by the check or coin inserted into the machine in the manner above described.

It will be seen that I provide positive means for indicating to the attendant who is in rear of the machine that a certain vending unit has been operated and thereby that the article receiving compartment is empty. It will be seen that as the lever 100 moves from the position seen in Figs. 2 and 5 to that seen in Fig. 7, that the arm 100 will assume a different position in the slot 125, as will be understood by reference to Fig. 1, so that the attendant can see at a glance whether or not a vending unit has been operated and whether an article receiving compartment is filled with an article to be vended. When it is desired to refill one or more compartments the operator grasps the arm 27 with one hand and the rod 26 with the other hand, thereby unlocking said rods and causing the container 17 to rotate to the right, whereupon the cam 29 in alinement with the roller 16 will coöperate therewith and cause the door 11 to be moved into the closed position, while at the same time the operating cam face 111 of the cam 110 will coöperate with the cam 30 on the outer periphery of the container 17, thereby rotating said cam so that it engages with the shoulder 109 of the lever 106 and causes the outer end thereof to pass into the slot formed between the pivoted member 55 and the inner wall 56 of the coin chute 54 so that if the intending purchaser should pass a coin into the coin chute 54 while the container 17 is in inoperative position, such coin would be stopped therein and when the handle 62 was actuated to rotate the shaft 61 the pivoted member 55 would open into the position seen in dotted lines in Fig. 8, owing to its own weight, so that such coin would pass through the coin chute 116 into the conduit 117 and thence to the receptacle 118 which is exterior of the machine so that the coin would be returned into a position accessible to the intending purchaser.

At the same time, the cam 30 is causing the above described operation on the lever 106, the pin 114 will engage one of the walls of the recess 83 and cause the coin retainer 80 to be moved rearwardly on its fulcrum 82 against the tension of the spring 103 until the catch 87 slides over the catch 88 and engages therewith, it being seen that such catches 87 and 88 have their rear faces preferably beveled and since such movement presses downwardly on the plate 89, the spring 94 will raise the plate 89 to its normal position to cause the interlocking of the catches 87 and 88. As the coin retainer 80 moves on its fulcrum 82, the arm 50, owing to the manner in which it is connected to the cam plate 39, will cause the lever 35 to move into the position seen in Figs. 13 and 14 in order to bring the spring pressed plungers 45 into engagement with the apertures 47 in the frame of the door 11. The articles which it is desired to vend are now placed within the proper compartments and the article container 17 is rotated so that the rod 26 will interlock with the arm 27, whereupon the machine is ready to be operated again in the manner hereinbefore described.

As the coin container 17 is moved into the position in which the open end of the compartments 20 register with the door 11, the cam 30 will coöperate with the end 112 of the cam member 110 so as to permit the forward end 108 of the arm 106 to move out of the path of the slot in the coin chute so that a coin of the proper dimension may pass therethrough. It will be understood that if the coin is of the proper dimension it will be guided by the flange 65 through the coin chute but if a thinner coin is employed, owing to the provision of the V-shaped groove at the bottom of the slot, the coin will drop into said slot into such a position that it will not engage with the flange 65 and will be supported on the pivoted member 55 so that when the actuating handle 62 is operated and the pivoted member 55 permitted to open, any coin or counterfeit thereof retained in the coin slot will fall therefrom into the discharge conduit 116 which leads to the receptacle 118 which latter is exterior of the machine and accessible to the purchaser. By adjusting the set screw 126 the coin mechanism may be adjusted within one one-thousandth of an inch so that if a coin is thicker than the coin for which the machine is adjusted, then it will engage with the set screw 126 and be stopped, so that upon the opening of the pivoted member 55 by the rotation of the handle 62 the coin will be discharged into a position accessible to the purchaser, as hereinbefore explained.

The inlet in the front of the machine frame which communicates with the coin chute 24 is preferably formed of such a size that it will only receive a coin having a predetermined diameter, it being understood that if the coin is of the proper diameter it will pass directly from the coin chute 24 to the retainer 80, while if the coin is not of the proper diameter it will be stopped in the coin chute so that it cannot enter the coin retainer to actuate the vending portion of the mechanism.

If it is desired to vend an article of food which it is desired to maintain at a predetermined temperature, a container 17 of a different construction would be employed and if it is desired to maintain the articles to be vended in a chilled or frozen condition a container such as is disclosed and broadly claimed in my co-pending application, Serial No. 666,918, filed by me on the 20th day of December, 1911, is employed; while if the article to be vended is one which it is desired to be maintained in a warm condition, a container such as is described and broadly claimed in my co-pending application Serial No. 666,919 filed by me on the 20th day of December, 1911, will be employed, although as is apparent, my novel construction of vending apparatus is adapted to be employed with any desired type of container and is not limited to use in conjunction with a construction such as those to which I have herein referred.

In some cases arising in practice it has been found advantageous to employ a tension device consisting of a spring 127, one end of which is seated in an apertured boss 128 carried by the arm 50, while the other end thereof is adapted to bear against a bent end 129 of an arm 130 which is apertured as indicated at 131, in order that the same may be mounted on the pin 74, said arm extending beyond the aperture 131 in order to form an extension which is adapted to be secured with respect to the arm 173 by means of a suitable fastening device 132. If desired the tension device consisting of the spring 127 and its adjuncts may be made sufficiently strong to render it possible to eliminate the employment of the springs 68 and 103, so that the spring 127 will be the means for causing the coin retainer 80 and also the shaft 61 to be returned to their normal or initial position, as will be apparent to those skilled in this art.

It will now be apparent that I have devised a novel and useful construction which embodies the features of advantage enumerated as desirable in the statement of the invention and the above description and while I have, in the present instance, shown and described a preferred embodiment thereof, which has been found in practice to give satisfactory and reliable results, it is to be understood that the same is susceptible of modifications in various particulars without departing from the spirit or scope of the invention or sacrificing any of its advantages.

Having thus described my invention, what I claim as new and desire to secure by Letters Patent, is:—

1. In a vending machine having a coin slot, a coin retainer movably mounted and normally registering with said slot, means for adjusting the coin slot to receive one or more coins, means coacting with a coin in said retainer to move the latter, and means controlled by the movement of said coin retainer to prevent the passage of a coin through the coin slot when said coin retainer is out of its normal position.

2. In a vending machine having a coin slot, a coin retainer, resilient means for retaining said coin retainer normally in register with said slot, a shaft rotatably mounted, a cam carried thereby and adapted to engage a coin in said coin retainer to move the latter from normal position, and means carried by said coin retainer for indicating to the attendant that the coin retainer has been moved from normal position.

3. In a vending machine having a coin slot, a coin retainer adapted to normally register therewith, a catch carried by said coin retainer, a resiliently mounted catch adapted to interlock with said first catch, a tension device adapted to move said coin retainer when said catches are released, and means coacting with a coin in said coin retainer for unlocking said catches.

4. In a vending machine having a coin slot, a coin retainer adapted to normally register therewith, a catch carried by said coin retainer, a resiliently mounted catch adapted to interlock with said first catch, a tension device adapted to move said coin retainer when said catches are released, means coacting with a coin in said coin retainer for unlocking said catches, and a lever pivotally mounted and connected with said coin retainer and adapted to be manually actuated to unlock said catches.

5. In a vending machine having a coin slot, a coin retainer movably mounted and adapted to receive a coin from said slot, a catch carried by said coin retainer, a spring actuated catch adapted to interlock with the coin retainer catch, means coacting with a coin in said coin retainer to unlock said catches, a tension device for moving said coin retainer when said catches are unlocked, and a coin chute adapted to receive the coin discharged from said coin retainer.

6. In a vending machine having a coin slot, a coin retainer movably mounted and adapted to receive a coin from said slot, a support resiliently mounted and adapted to lock said coin retainer in operative position, a member carried by said support and adapted to serve as a stop for a coin in said coin retainer, means coacting with said stop to move said support and thereby unlock said coin retainer, and means for causing the movement of said coin retainer when unlocked.

7. In a vending machine having a coin slot, a coin retainer movably mounted and adapted to receive a coin from said coin slot, a support resiliently mounted, a catch carried thereby, a catch carried by said coin retainer to lock the latter in position to receive a coin from said coin slot, means for causing the downward movement of said support to release said catches, a tension device for imparting movement to said coin retainer when unlocked, and door locking mechanism controlled by said coin retainer.

8. In a vending machine having a coin slot, a coin retainer movably mounted and adapted to receive a coin from said coin slot, a support resiliently mounted, a catch carried thereby, a catch carried by said coin retainer to lock the latter in position to receive a coin from said coin slot, means for causing the downward movement of said support to release said catches, a tension device for imparting movement to said coin retainer when unlocked, door locking mechanism controlled by said coin retainer, a door coöperating with said door locking mechanism, and devices controlled by said means for opening said door when the same is unlocked.

9. In a vending machine, a coin slot, a coin retainer movably mounted, a support movably mounted, a tension device for normally retaining said support in raised position, devices common to said support and coin retainer for locking the latter in position to receive a coin from said coin slot, means coacting with a coin in said coin retainer to impart movement to said support and thereby unlock said coin retainer and positively move the latter, and a tension device coacting with said coin retainer to assist such movement.

10. In a vending machine, a coin retainer pivotally mounted, means for guiding the coin to said coin retainer, means for locking said coin retainer in operative position, a tension device to move said coin retainer from operative position, a container for the articles to be vended, a door controlling access to such articles, door locking mechanism actuated by said coin retainer, means coöperating with said coin retainer for returning the coin retainer to normal position, and devices controlled by the last named means for preventing a coin passing to said coin retainer.

11. In a vending machine having a coin slot, a coin retainer movably mounted, a support movably mounted, a tension device for said support, means coöperating with said support and coin retainer to lock the latter in position to receive a coin from said coin slot, a lever adapted to bear against said support to release the coin retainer, and directly connected with the latter, door locking mechanism controlled by said coin retainer, and means for causing the movement of the coin retainer.

12. In a vending machine, a coin retainer movably mounted, a tension device to move the coin retainer from normal position, means for guiding a coin to the coin retainer when the latter is in normal position, devices for locking said coin retainer in normal position, means for moving said coin retainer from normal position, mechanism for indicating to the attendant that the coin retainer has been moved from normal position, and devices actuated by said coin retainer during its movement in either direction.

13. In a vending machine having a coin slot, an apertured coin retainer movably mounted and adapted to receive a coin from said slot, a plate movably mounted and closing one end of said aperture, means for interlocking said plate and coin retainer, devices for unlocking said plate and coin retainer and moving the latter beyond said plate to permit a coin to discharge therefrom, and mechanism controlled by said coin retainer.

14. In a vending machine having a coin slot, a coin retainer movably mounted and having a passage therethrough, a member resiliently mounted and forming a closure for said passage, means for interlocking said coin retainer and member, means for unlocking said coin retainer and member and imparting movement to the coin retainer, a counterbalanced lever out of the path of a coin in the coin slot when the member and coin retainer are interlocked and actuated by said coin retainer when unlocked to move it into the path of a coin in the coin slot, and mechanism controlled by the coin retainer.

15. In a vending machine, a frame having a coin discharge chute and a coin return chute having a coin slot in proximity to the coin return chute, a coin retainer in proximity to the coin discharge chute, a detent for retaining said coin retainer in position to receive a coin from the coin slot, means for actuating said detent and causing the movement of said coin retainer to permit a coin to discharge into the coin discharge chute, devices for permitting a coin of improper dimension passing through the coin slot and for preventing any coin passing through the coin slot when said coin retainer is out of normal position, and means for opening said coin slot to permit a coin retained therein to pass to the coin return chute.

16. In a vending machine provided with a coin slot having a pivoted side, a coin retainer adapted when in normal position to receive a coin from said coin slot, a shaft rotatably mounted and connected with said open side, means carried by said shaft for moving said coin retainer in one direction, resilient means for maintaining the coin retainer in normal position, door locking mechanism controlled by said coin retainer, a container for the articles to be vended, and a cam rotatably mounted and actuated by said container during its movement, and coacting with said coin retainer to return the same to normal position.

17. In a vending machine provided with a coin slot having a pivoted side, a coin retainer adapted when in normal position to receive a coin from said coin slot, a shaft rotatably mounted and connected with said open side, means carried by said shaft for moving said coin retainer in one direction, resilient means for maintaining the coin retainer in normal position, door locking mechanism controlled by said coin retainer, a container for the articles to be vended, a cam rotatably mounted and actuated by said container during its movement, and coacting with said coin retainer to return the same to normal position, and means controlled by said rotatable cam for preventing the passage of a coin through the coin slot when the container has been moved from its normal position.

18. In a vending machine provided with a coin slot having a movable side, a shaft connected with said open side, a coin retainer movably mounted, means for locking said coin retainer in a position to receive a coin from said coin slot, a member movably mounted adapted to prevent the passage of a coin through the coin slot and controlled by said coin retainer, means for adjusting said member with respect to said coin retainer, devices controlled by said shaft for unlocking said coin retainer and moving the latter, and mechanism actuated by said coin retainer.

19. In a vending machine, an operating shaft rotatably mounted, a lever actuated by said shaft, a tension device controlled by said lever, a coin retainer movably mounted and moved in one direction by said tension device to lock it in position to receive a coin, means for guiding coins to said coin retainer, and devices coöperating with said shaft and coin retainer to cause the movement of the latter at the proper time.

20. In a vending machine, a coin retainer movably mounted and having a slot therethrough, adjustable stops adapted to enter said slot to vary the number of coins in the coin retainer, means for locking said coin retainer in normal position, and devices coacting with one of said stops to cause the unlocking of said coin retainer and to impart a movement thereto, and mechanism controlled by said coin retainer.

21. In a vending machine having a coin slot, a coin retainer adapted to receive coins from said slot, means for adjusting the coin slot to receive one or more coins, coin registering mechanism in the path of a coin passing from said slot to said coin retainer, and means for actuating said coin retainer.

22. In a vending machine having a coin slot, a coin retainer adapted to receive coins from said slot, coin registering mechanism in the path of a coin passing from said slot to said coin retainer, means for actuating said coin retainer, and a lever connected with said coin retainer for visibly indicating exterior of the machine that such coin retainer has been actuated.

23. In a vending machine, a casing, a door mounted therein, a spring carried by said door, a food container rotatably mounted in said casing, and having an open side adapted to register with said door, door locking mechanism, a movable coin retainer for actuating said door locking mechanism, means controlled by a coin for moving the coin retainer in one direction, means controlled by the container for moving the coin retainer in an opposite direction, devices controlled by said first means and coacting with said spring to open said door when unlocked, and devices coöperating with said container for closing said door.

24. In a vending machine having a coin slot, a coin retainer movably mounted and adapted to receive a coin from said slot, devices for preventing the passage of a coin through the coin slot and moving the coin retainer into register with the coin slot, and an article container rotatably mounted and having means thereon coöperating with said devices.

25. In a vending machine having a coin slot, a coin retainer movably mounted and adapted to receive a coin from said slot, devices for preventing the passage of a coin through the coin slot and moving the coin retainer into register with the coin slot, an article container rotatably mounted and having means thereon coöperating with said devices, and means for locking said article container in position.

26. In a vending machine, a coin retainer movably mounted and having a slot therethrough, adjustable stops adapted to enter said slot to adapt the same to receive one or more coins, a closure for the bottom of said slot, and means for moving said coin retainer beyond said closure to permit the coins to discharge therefrom.

27. In a vending machine, a coin retainer movably mounted and having a coin slot therethrough and an aperture opening into said slot, coin stops adjustably carried by the coin retainer and adapted to enter said slot, a closure for the bottom of said slot, a coin stop adjustably carried by said closure and adapted to enter said slot through said aperture, devices for interlocking said coin retainer and closure, and means for moving a coin against the stop carried by said closure to cause the unlocking of said coin retainer and closure.

28. In a vending machine, a coin retainer movably mounted and having a coin slot therethrough and an aperture opening into said slot, coin stops adjustably carried by the coin retainer and adapted to enter said slot, a closure for the bottom of said slot, a coin stop adjustably carried by said closure and adapted to enter said slot through said aperture, devices for interlocking said coin retainer and closure, means for moving a coin against the stop carried by said closure to cause the unlocking of said coin retainer and closure, door locking mechanism controlled by the coin retainer, and an article container movably mounted and adapted to return said coin retainer to cause said devices to interlock it with said closure.

JOHN FRITSCHE.

Witnesses:
H. S. FAIRBANKS,
C. D. McVAY.